United States Patent
Lin

[15] 3,681,481
[45] Aug. 1, 1972

[54] CATALYTIC ADDITION OF COMPOUNDS HAVING A P-H BOND TO ACETYLENE

[72] Inventor: Kingso Lin, Chingtsung, Newark, Ohio

[73] Assignee: Hooker Chemical Corporation, Niagara Falls, N.Y.

[22] Filed: Nov. 12, 1969

[21] Appl. No.: 876,140

[52] U.S. Cl. .................260/970, 252/46.6, 252/49.8, 252/77, 252/400, 260/30.6 R, 260/45.7 P, 260/45.7 PS, 260/45.95, 260/429 R, 260/439 R, 260/438.5 R, 260/606.5 P, 260/932
[51] Int. Cl. .............................C07f 9/40, C07f 9/00
[58] Field of Search .......................260/970, 606.5 P

[56] References Cited

UNITED STATES PATENTS 2,957,931   10/1960   Hamilton et al. ..........260/970 X

*Primary Examiner*—Joseph Rebold
*Assistant Examiner*—Anton H. Sutto
*Attorney*—Peter F. Casella, Donald C. Studley, Richard P. Mueller, James F. Mudd and Richard K. Jackson

[57] ABSTRACT

Compounds containing a P-H bond add to acetylene in the presence of metal coordinating catalysts selected from groups VIA and VIII of the periodic table, to produce saturated organophosphorus compounds in good yields. The saturated organophosphorus compounds find utility as stabilizers, plasticizers and flame retardant additives for organic polymers, lubricating oils and hydraulic fluids.

8 Claims, No Drawings

CATALYTIC ADDITION OF COMPOUNDS HAVING A P-H BOND TO ACETYLENE

BACKGROUND OF THE INVENTION

The preparation of tetrabutyl ethylenediphosphonate has been accomplished by the addition of di-n-butyl phosphite to acetylene in the presence of a free radical catalyst (U.S. Pat. No. 2,957,931). Similar compounds have been prepared by the addition of a dialkyl phosphite to a dialkyl vinylphosphonate in the presence of a strongly basic catalyst (U.S. Pat. No. 2,651,656).

BRIEF DESCRIPTION OF THE INVENTION

In accordance with this invention, it has been discovered that compounds of the formula:

$$R_2P(X)_n-CH_2CH_2-P(X)_nR_2$$

in which R is a member of the group consisting of —H, alkyl of one to 18 carbon atoms, alkoxy of one to 18 carbon atoms, and aryl of six to 12 carbon atoms, X is a member of the group consisting of oxygen and sulfur and $n$ is an integer from 0 to 1, can be prepared by a process which comprises reacting a compound of the formula:

$$R_2P(X)_nH$$

in which R, X and $n$ are defined above, with acetylene at a temperature between about 20° to about 200°C. in the presence of a catalyst selected from the coordination forming metals of group VIA and VIII of the periodic table.

DETAILED DESCRIPTION OF THE INVENTION

This invention relates to the catalytic addition of compounds containing a phosphorus-hydrogen (P—H) bond to acetylene (CH≡CH) to produce two phosphorus-carbon bonds in a product having the structure $$R_2(X)_nP-CH_2CH_2P(X)_nR_2$$

in which the terms R, X and $n$ defined above.

The catalysts found to be effective in the reaction of this invention include salts and complexes of the transition metals which have been employed in the art as the catalysts for the addition and polymerization of acetylenic compounds. The metal salts and their complexes are based upon the metals of groups VIA and VIII of the periodic table. Especially applicable catalysts are the salts of iron, cobalt, nickel, ruthenium, rhodium, palladium, iridium, osmium and platinum, and their complexes. However, chromium, molybdenum and tungsten salts and their complexes may be employed under proper process conditions as the catalysts for the process of this invention.

The ligands which may be used in the metal complex catalyst for this invention include carbonyl, ammonia, alkylamines, arylamines, alkylene diamines, arylnitriles, alklnitriles, oximes, aldimines, ketimines, arylazo compounds, alkylphosphines, arylphosphines, alkylphosphites, arylphosphites, dialkylformamides, and the like. The ionic ligands which may be used in the metal catalyst for this invention are generally any salt of the transition metals, such as halides, carboxylates, sulfonates, phosphites, phosphates, cyanides, phenolates, thiophenolates, imides, alkylphosphides, acetylacetonates, isocyanates, thiocyanates, cyanates, isothiocyanates, and the like.

The formation of a coordination complex between a transition metal and a ligand such as acetylene or a compound containing a P—H bond may proceed directly or by substitution of new ligand for a ligand previously coordinated with the metal. For example, platinum and palladium chloride will enter directly into coordination complexes with acetylene. Chromium, molybdenum, tungsten, iron, cobalt, nickel, osmium and irridium form complexes with acetylenic unsaturation usually when other strongly pi-bonding ligands are present.

It is known that acetylene will enter into various types of coordinated complexes with transition metals (Advances In Organo Metallic Chemistry, Vol. 5, 1967, pp. 114–120). It is believed that the complex formation involved in the instant invention is either of the type in which acetylene becomes bonded to the metal and is still identifiable as such, with the possible loss of one or more of the original ligand groups of the parent molecule, or the complex is the type obtained during the polymerization of acetylene.

The transition metal salts and their complexes employed in this invention generally form rather stable complexes with acetylene and a donor molecule containing the phosphorus atom. Because both acetylene and compounds containing the P—H bond are capable of acting as ligands in the formation of coordination compounds with transition metal salts, the catalytic species or the reactive intermediate may be regarded as either one or both of the acetylene and the phosphorus compound complexed through coordination bonds with the transition metal atom. As a result of the pi-bonding between the metal atom and acetylene, the later molecule becomes very reactive and susceptible to the addition of a molecule containing a nucleophilic atom.

Although applicant does not desire to be bound by any specific reaction mechanism, it is believed that the reaction of a compound containing a P-H bond with acetylene in the presence of a transition metal salt or complex proceeds by any one of the following paths in which M represents the transition metal, L represents a ligand and $n$ is the number of complexed L's:

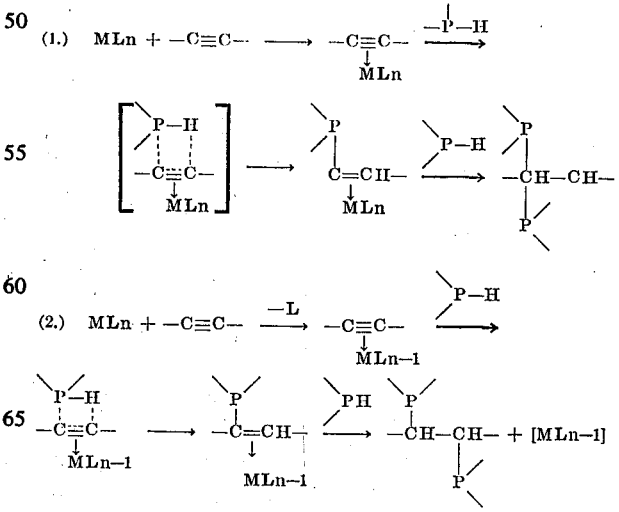

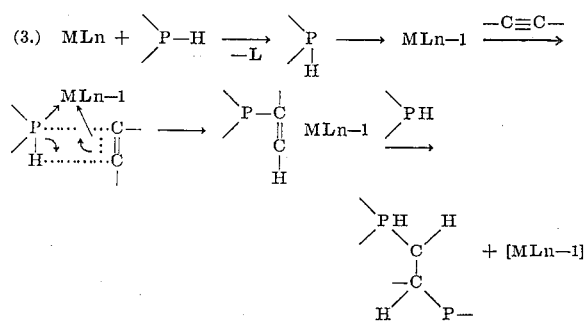

Path (1.) represents the formation of a coordination complexes, initial cis-addition and ultimate diaddition without legand displacement in the catalyst. Path (2.) illustrates the reaction mechanism which may take place with the displacement of a ligand from the transition metal complex. Path (3.) illustrates a reaction mechanism through which the reactant containing the P—H bond enters directly into a coordination complex with the metal atom of the transition metal complex.

The pi-bonding between acetylene and the transition metal atom is evidenced from the fact that cis-addition occurs initially in the mono addition product.

Reactants of the type contemplated in the instant invention which contain a P—H bond are those compounds embraced by the following formula:

$$R_2P(X)_nH$$

in which R is an alkyl group of 1–18 carbon atoms, alkoxy of 1–18 carbon atoms, or aryl of 6–12 carbon atoms. X is oxygen or sulfur and $n$ is from 0 to 1.

More specifically, the reactants employed in this invention include dimethyl phosphine, diethyl phosphine, dipropyl phosphine, dibutyl phosphine, diamyl phosphine, dihexyl phosphine, diheptyl phosphine, dioctyl phosphine, dinonyl phosphine, didecyl phosphine, the corresponding dialkoxy phosphines, diphenyl phosphine, ditolyl phosphine and the corresponding primary and secondary phosphites and thio-phosphites.

The reaction of a compound containing a P—H bond with acetylene to produce the diaddition product may be conducted in a suitable inert solvent. Representative inert solvents are the lower alkanols such as methanol, ethanol, propanol, etc; hydrocarbons such as alkanes of five to 18 carbon atoms, benzene, toluene, etc; ethers such as diethyl ether, dioxane, tetrahydrofuran, etc; nitriles such as acetonitrile, benzonitrile, etc; esters such as ethyl acetate, etc; amides such as dimethyl formamide; and the like. The reaction may be conducted in the absence of a solvent by the application of a suitable pressure to prevent the escape of gaseous reactants.

The temperature of reaction varies somewhat with the reactants but generally lies between room temperature and 200°C. Preferably the temperature is between 40° to 180°C. Generally, it is preferred that the reaction be conducted in the presence of an inert atmosphere which may be provided by nitrogen, argon, etc.

The reaction time necessary for a complete reaction will vary somewhat with the reactants, but generally the reaction may be completed within 10 hours. A catalytic amount of the metal complexing agent (0.01 to about 1.0 mole percent) is sufficient to afford a high yield of the addition products. Preferably the amount of the catalyst used is 0.16 to about 0.32 mole percent.

After the initial reaction of the compound containing a P—H bond with acetylene to produce an unsaturated addition product, the rate of acetylene absorption in the reaction mixture drops significantly. Upon extended heating, the further addition of the compound containing a P—H bond occurs relatively slowly in comparison to the initial addition step.

The reduced reaction rate in the production of the di-addition product may be attributed to the presence of the intermediate

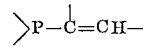

addition product which possibly serves as a weaker ligand than the initial reactant containing the P—H bond. Thus, the P—H ligand may serve as a strong ligand for formation of the metal coordination complex, blocking the reaction site from coordination to form the pi complex with the mono-addition product

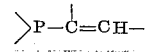

and the transition metal.

The retarded reaction involved in the formation of the di-addition product may also be attributed to the decreased reactivity of the carbon-carbon unsaturation of the mono-adduct

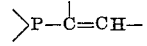

due to the interaction of the electrons in the $d$ orbitals of phosphorus and the pi orbitals of the carbon-carbon double bond.

In any event, the formation of the diaddition product of acetylene and a reactant containing a P—H bond takes place upon extended heating after formation of the unsaturated addition product, in the presence of an excess of the P—H compound. Hence, the initial addition reaction may take from one to about 10 hours for an obvious decrease in the absorption rate of acetylene to occur. Generally from about 3 to 4 hours is sufficient to complete the first addition. After the recognition of reduced acetylene absorption occurs, the reaction mixture is maintained at the reaction temperature in the presence of an excess of the compound containing the P—H bond for a period of from 1 to 10 additional hours to obtain the diaddition product in good yield.

The saturated organo-phosphorus compounds resulting from the process of this invention find utility as stabilizers, plasticizers and flame retardant additives for organic polymers. Furthermore, the products obtained by the process of this invention may be employed as additives for lubricating and hydraulic fluid.

The following examples are presented to illustrate various specific embodiments of the instant invention, and are not to be construed as representing a limitation on the scope of the invention.

Reference to the transition metals in groups VIA and VIII, of the periodic table, supra, is based upon those groups as they appear in the Handbook of Chemistry and Physics, 32nd Edition, 1950–1951, Chemical Rubber Publishing Company. pp. 336–337.

EXAMPLE I

A reaction mixture of 150 grams

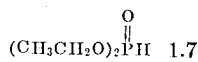  1.7
grams of NiBr₂ and 3.03 grams of tributyl phosphine was placed in a three necked flask equipped with a thermometer, reflux condenser and a sintered glass bubbler. The solution became dark purple in color upon heating at 100°C for 20 minutes. Acetylene was then bubbled through the solution at a rate governed by the absorption of acetylene in the solution. The reaction temperature was maintained at from about 170° to 180°C. After 5 hours of acetylene addition the reaction mixture was cooled to room temperature and distilled to give:

Fraction I—92.3 grams of a mixture of diethyl phosphite and diethyl vinylphosphonate having a boiling point <140°C/0.5 mm;

Fraction II—23.3 grams of material having a boiling point >140°C/0.5 mm identified as tetraethyl ethylene diphosphonate; and 37.4 grams of residue.

Redistillation of fraction II gave tetraethyl ethylene diphosphonate of boiling point 118°–120°C/0.03 mm; $n_D^{25}$ 1.4419.

Elemental Analysis of fraction II; $C_{10}H_{24}P_2O_6$
Calculated: C; 39.70, H; 7.95, P; 20.5
Found: C; 39.90, H; 7.86, P; 20.28
Molecular Weight Calculated = 302
Molecular Weight Determined = 305
The IR spectrum gave readings at 2,990, 2,940, 2,920, 2,880 cm⁻¹
(—CH—, CH₂—, —CH₃), 1,425 cm⁻¹ (possible P—C), 1,255 cm⁻¹ (P = O).

EXAMPLE II

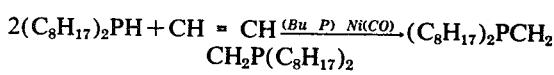

In a manner similar to that of example I, dioctyl phosphine, $CH_3(CH_2)_7PH$ was reacted with acetylene in the presence of $(CH_3CH_2CH_2CH_2P)_2Ni(CO)_2$ to produce the diaddition product $CH_3(CH_2)_7PCH_2CH_2P(CH_2)_7CH_3$. The addition did not take place below 180°C. A slow reaction began at 185°–190°C. Distillation of the reaction mixture gave a 65 percent recovery of dioctyl phosphine and 35 percent of a material of boiling point >220°C./0.05 mm. The IR spectrum of the distillation residue demonstrated the absence of P—H and —CH=CH₂ absorption bands in the product ethylene bis-dioctyl phosphine.

EXAMPLE III

A series of experiments were performed employing different P—H containing reactants, acetylene and catalysts as follows:

| Run | (RO)₂P—H(g) | Catalyst (g) | Reaction temp. | time hr. | Vinyl- phosphonates conversion | yield % | other products |
|---|---|---|---|---|---|---|---|
| a | R = CH₃ (150) | (Bu₃P)₂NiBr₂ (4.63) | 140–145 | 3 | 42 | >90 | ≈2% di-addition product |
| b | R = CH₃ (150) | (Bu₃P)₂Ni(CO)₂ (4.35) | 140–145 | 3 | 51 | >90 | ≈2% di-addition product |
| c | R = C₂H₅ (150) | (Bu₃P)₂NiBr₂ (4.63) | 165 | 3 | 20 | ≈65 | 15–20% high boiling and di-addition product |
| d | R = C₂H₅ (150) | (Bu₃P)₂NiBr₂ (4.63) | 150–155 | 4 | 38 | ≈75 | 2–3% high boiling and di-addition product |
| e | R = (CH₃)₂CH(Bu₃P)₂ (150) | Ni(CO)₂ | 165–170° | 3 | ≈17 | ≈65 | 10% high boiling and di-addition products and 11.5 g polyacetylene |

Dialkyl phosphites were redistilled prior to the reaction but containing impurities: CH₃ - (85% purity) C₂H₅O - (87%) and (CH₃)₂CH - (87%). The vinylphosphonates obtained were characterized from refractive index, elementary analysis and IR spectra. Conversions were calculated from G. C. data. Yields were calculated from the result of distillation. The IR spectrum of the polyacetylene produced in a run e indicated a highly crosslinked product containing phosphorus (2.1% P from elementary analysis). All the runs were carried out in a three necked flask equipped with a thermometer, a gas bubbler, a condenser and a stirrer at atmospheric pressure. By prolonging the reaction time while maintaining the recited reaction temperature, the yield of the diaddition product continues to increase.

EXAMPLE IV

The following experiments were performed to illustrate the use of various ionic ligands. The catalyst NiX₂ was employed in the addition of $(CH_3CH_2O)_2\overset{O}{\overset{\|}{P}}$—H to CH≡CH at a reaction temperature of 165°C. for 4 hours. The ratio of $(CH_3CH_2O)_2\overset{O}{\overset{\|}{P}}$—H to NiX₂ was 1.2 moles to 7.5 × 10⁻³ moles.

| | 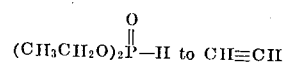 (percent) | 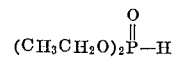 (percent) | Other percent |
|---|---|---|---|
| Br⁻ | 25 | 7.5 | 4.5 |
| SCN⁻ | 28 | 3.8 | 2.0 |
| $CH_3\overset{O}{\overset{\|}{C}}CH=\overset{O}{\overset{\|}{C}}CH_3$ | 38 | 7.5 | 3.4 |

The yield of the diaddition product is greatly increased by prolonged heating of the reaction mixture after the initial formation of the mono-addition product.

During the addition reaction, a series of color changes are observed in each case. The catalytic activity of the transition metal complex appears to increase in the order of acetylacetonate $>SCN^->Br^->I^->NO_3^- \cong Cl^-$. Acetylene polymerization occurred as a biproduct to a limited extent when Ni acetylacetonate was used as the catalyst.

Employing the identical reaction conditions, with the use of coordinating ligands, the following results were obtained.

| $(O_3P)_2NiX_2$ | $(C_2H_5O)_2\overset{O}{\overset{\|}{P}}CH=CH_2$ percent | $[(C_2H_5O)_2\overset{O}{\overset{\|}{P}}CH_2-]_2$ percent | Other percent |
|---|---|---|---|
| $(O_3P)_2Ni(CO)_2$ | 21 | 5.2 | 8.8 |
| $(O_3P)_2NiCl_2$ | 23 | 3.7 | 5.3 |
| $(O_3P)_2NiBr_2$ | 54 | 2.5 | 4.5 |
| $(O_3P)_2Ni(SCN)_2$ | 48 | 4.2 | 11.8 |
| $(n-Butyl_3P)_2NiCl_2$ | 39 | 6.9 | 9.1 |

What is claimed is:

1. A process for the production of a compound of the formula:

$$R_2P(X)_n-CH_2CH_2-P(X)_nR_2$$

in which R is a member of the group consisting of alkyl of one to 18 carbon atoms, alkoxy of one to 18 carbon atoms, and aryl of six to 12 carbon atoms, X is a member of the group consisting of oxygen and sulfur and n is an integer from 0 to 1, which comprises reacting a compound of the formula: $R_2P(X)_nH$ in which R, X and n are defined above, with acetylene at a temperature between about 20°C to about 200°C in the presence of a catalyst selected from the group consisting of nickel bromide, nickel thiocyanate, nickel acetylacetonate, di(tributylphosphino) nickel bromide, di(tributylphosphino) nickel chloride, dicarbonyl (ditributylphosphino) nickel, dicarbonyl (triphenylphosphino) nickel, di(triphenylphosphino) nickel chloride, di(triphenylphosphino) nickel bromide, and di(triphenylphosphino) nickel thiocyanate.

2. The process of claim 1 in which the temperature of the reaction is from about 40° to about 180°C.

3. The process of claim 1 in which X is oxygen and n is 1.

4. The process of claim 1 in which the catalyst is dicarbonyldi-(triphenylphosphino)nickel.

5. The process of claim 1 in which the catalyst is dicarbonyldi(tri-n-butyl phosphino)nickel.

6. The process of claim 1 in which the catalyst is di(tributylphosphino) nickel bromide.

7. The process of claim 1 in which R is alkoxy of one to 18 carbon atoms.

8. The process of claim 1 in which R is alkyl of one to 18 carbon atoms.

* * * * *

PO-1050
(5/69)

UNITED STATES PATENT OFFICE
CERTIFICATE OF CORRECTION

Patent No. 3,681,481      Dated August 1, 1972

Inventor(s) Kingso Lin

It is certified that error appears in the above-identified patent and that said Letters Patent are hereby corrected as shown below:

Column 1, line 39 and Column 5, line 39, each occurrence "CH=CH" should read ---CH≡CH---; Column 1, line 61, "alklnitriles" should read ---alkylnitriles---. Column 3, line 16, "legand" should read ---ligand---. Column 5, line 39 "(Bu P) Ni(CO)" should read ---$(Bu_3P)_2Ni(CO)_2$---. In the table appearing at Column 6, line 54, the heading ---X--- of the first column ---X--- should be inserted; Column 6, line 59 "$CH_3\overset{O}{\underset{||}{C}}-\overset{}{\underset{|}{CH}}=CCH_3$" should read ---$CH_3\overset{O}{\underset{||}{C}}CH=\overset{O^-}{\underset{|}{C}}CH_3$---. Column 7, line 3, "Nl" should read ---Ni---.

Signed and sealed this 9th day of January 1973.

(SEAL)
Attest:

EDWARD M. FLETCHER, JR.
Attesting Officer

ROBERT GOTTSCHALK
Commissioner of Patents